(12) United States Patent
Kanenari

(10) Patent No.: US 7,368,506 B2
(45) Date of Patent: May 6, 2008

(54) RUBBER COMPOSITION AND PNEUMATIC TIRE USING SAME

(75) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/531,068

(22) PCT Filed: Jul. 9, 2004

(86) PCT No.: PCT/JP2004/010167

§ 371 (c)(1),
(2), (4) Date: Apr. 12, 2005

(87) PCT Pub. No.: WO2005/005546

PCT Pub. Date: Jan. 20, 2005

(65) Prior Publication Data

US 2005/0288441 A1 Dec. 29, 2005

(30) Foreign Application Priority Data

Jul. 9, 2003 (JP) ............................. 2003-194321
Jul. 17, 2003 (JP) ............................. 2003-198484

(51) Int. Cl.
B06C 5/14 (2006.01)
B60C 17/00 (2006.01)
B60C 1/00 (2006.01)
C08K 5/09 (2006.01)
C08K 3/00 (2006.01)

(52) U.S. Cl. ........................ 525/192; 260/31.2 MR; 260/31.2 N; 260/42.32; 260/42.37; 152/516; 152/510; 152/520; 152/514; 524/495; 524/496; 524/188

(58) Field of Classification Search ............... 525/192; 524/502, 188, 495, 496; 152/516, 510; 260/31.2 MR
See application file for complete search history.

(56) References Cited

U.S. PATENT DOCUMENTS

| | | | |
|---|---|---|---|
| 3,520,954 A * | 7/1970 | Blumel et al. | 525/197 |
| 3,938,574 A * | 2/1976 | Burmester et al. | 152/209.1 |
| 4,192,790 A * | 3/1980 | McKinstry et al. | 524/397 |
| 4,421,900 A * | 12/1983 | Hamed | 525/218 |
| 5,005,625 A * | 4/1991 | Klemmensen et al. | 152/510 |
| 6,103,811 A * | 8/2000 | Midorikawa et al. | 524/495 |
| 6,251,977 B1 * | 6/2001 | Georget et al. | 524/397 |
| 6,579,945 B2 * | 6/2003 | Obrecht et al. | 525/192 |
| 6,642,315 B2 * | 11/2003 | Amino et al. | 525/232 |
| 6,767,945 B2 * | 7/2004 | Hahn et al. | 524/187 |
| 6,812,277 B2 * | 11/2004 | Zanzig et al. | 524/496 |
| 7,117,911 B2 * | 10/2006 | Kanenari et al. | 152/516 |
| 2002/0086944 A1 | 7/2002 | Obrecht et al. | |

FOREIGN PATENT DOCUMENTS

| | | | |
|---|---|---|---|
| JP | 08-269241 | * | 10/1996 |
| JP | 08-269241 A | * | 10/1996 |
| JP | 08-269241 A1 | | 10/1996 |
| JP | 11-147402 A1 | | 6/1999 |
| JP | 2000-026674 A1 | | 1/2000 |
| JP | 2000-272023 A1 | | 10/2000 |
| JP | 2002-030187 A1 | | 1/2002 |
| JP | WO 03/029029 A1 | * | 4/2003 |
| WO | WO-99/16823 A1 | | 4/1999 |

OTHER PUBLICATIONS

PCT International Search Report for PCT/JP2004/010167 mailed on Oct. 26, 2004.

* cited by examiner

*Primary Examiner*—Duane Smith
*Assistant Examiner*—Ives Wu
(74) *Attorney, Agent, or Firm*—Connolly Bove Lodge and Hutz LLP

(57) ABSTRACT

A peroxide-crosslinked rubber composition having a superior anti-blooming property of a crosslinking agent and a high hardness containing (A) more than 60 parts by weight but not more than 95 parts by weight of rubber selected from NR, IR, SBR, BR, EPM, EPDM, silicone rubber and/or fluororubber and (B) 5 parts by weight but less than 40 parts by weight of a polar polymer having a solubility parameter (Sp value) of at least 17.6 ($Pa^{1/2}$) and a weight average molecular weight of at least 100,000.

5 Claims, 1 Drawing Sheet

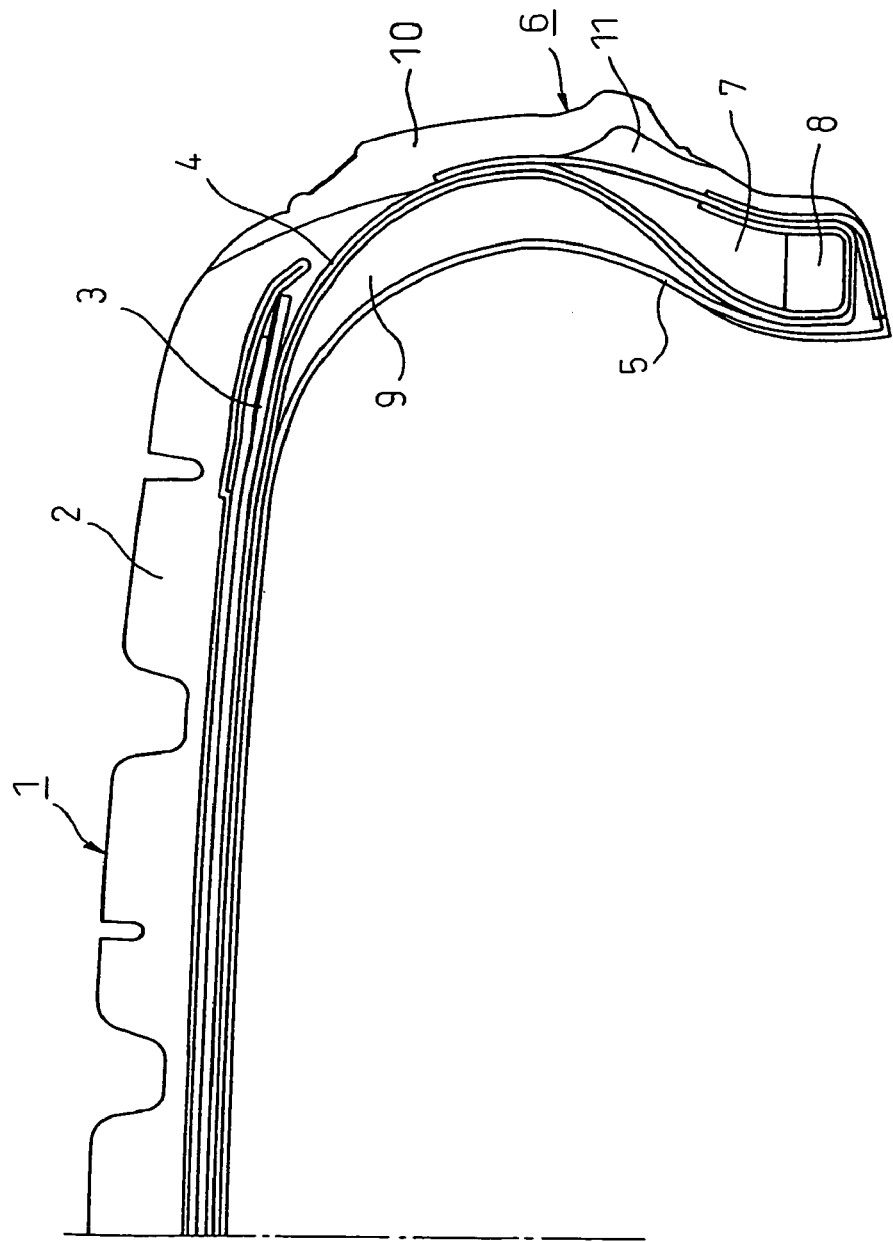

RUBBER COMPOSITION AND PNEUMATIC TIRE USING SAME

TECHNICAL FIELD

The present invention relates to a high hardness rubber composition having an improved anti-blooming property of a crosslinking agent. More specifically, it relates to a high hardness rubber composition having a superior bondability with a general purpose rubber and a pneumatic tire using the same as a side reinforcing layer or bead filler, in particular having a run flat property.

BACKGROUND ART

As means for obtaining high hardness rubber in the past, the general practice is to blend a large amount of a crosslinking agent into a rubber. However, a crosslinking agent is generally low in solubility with a low polarity rubber such as a general purpose rubber, and therefore, if a rubber containing a large amount of a crosslinking agent is allowed to stand for a certain time or more, there was the problem that the crosslinking agent would cause blooming (or precipitating) on the rubber surface. As a method to solve such a problem, it is possible to use an insoluble sulfur, when crosslinking rubber with sulfur, so as to suppress blooming to a certain extent, but there has been no such method of solution, as in the case of using an in insoluble sulfur, in the case of rubber crosslinked with a non-sulfur type crosslinking agent such as a peroxide. However, in the case of a rubber for using in applications requiring thermal resistance (e.g., EPDM), peroxide cross-linking results in superior thermal resistance etc. compared with sulfur cross-linking and therefore is more preferable, but there has been a problem that the rubber obtained by a peroxide crosslinking is generally lower in modulus and other physical properties compared with rubber obtained by a conventional sulfur crosslinking (See, for example, Japanese Unexamined Patent Publication (Kokai) No. 6-191805).

On the other hand, a run flat tire capable of running on for a certain distance, even if the tire pressure rapidly drops due to a puncture, burst, etc. is known in the art. For example, a pneumatic tire having a run flat property using a rubber composition comprising a hydrogenated nitrile rubber containing zinc methacrylate etc. for a side reinforcing rubber layer having a crescent sectional shape has been proposed (see Japanese Unexamined Patent Publication (Kokai) No. 11-100463). This rubber composition exhibits a high hardness suitable for the side reinforcing layer of a run flat tire, but there was a problem that the vulcanization bondability with a conventional rubber used for tires is not sufficient, an adhesive rubber layer is needed, and, therefore, the productivity is poor. If the amount of the rubber composition comprising the hydrogenated nitrile rubber containing zinc methacrylate etc. is decreased, the vulcanization bondability is improved, but there is a problem that the desired strength required for a side reinforcing rubber is not able to be obtained.

DISCLOSURE OF THE INVENTION

Accordingly, the objects of the present invention are to provide a rubber composition eliminating the problems in the above prior art and exhibiting a superior anti-blooming property of the crosslinking agent and a high strength.

Another object of the present invention is further to provide a pneumatic tire having a run flat property using a high hardness rubber composition superior in vulcanization bondability with, in particular, a conventional rubber among the above compositions for the side reinforcing rubber layer and/or bead filler, without using an adhesive rubber layer.

In accordance with the present invention, there are provided a peroxide-crosslinked rubber composition having a superior anti-blooming property comprising (A) more than 60 parts by weight, but not more than 95 parts by weight of at least rubber selected from the group consisting of natural rubber (NR), a polyisoprene rubber (IR), a styrene-butadiene copolymer rubber (SBR), a polybutadiene rubber (BR), an ethylene-propylene rubber (EPM), an ethylene-propylene-diene terpolymer (EPDM), a silicone rubber and a fluororubber and (B) at least 5 parts by weight but less than 40 parts by weight of a polar polymer having a solubility parameter (Sp value) of at least 17.6 ($Pa^{1/2}$) and a weight average molecular weight of at least 100,000, wherein the total weight of the components (A) and (B) is 100 parts by weight and a pneumatic tire using the same.

In accordance with the present invention, there are also provided a peroxide-crosslinked rubber composition comprising (A') a rubber component containing at least 40 parts by weight of a polybutadiene rubber, (B') a rubber composition comprising 100 parts by weight of an ethylenically unsaturated nitrile-conjugated diene-based high saturation copolymer rubber having a conjugated diene unit content of 30 wt % or less and 20 to 120 parts by weight of a metal salt of an ethylenically unsaturated carboxylic acid blended therein, in an amount of 5 to 40 parts by weight based upon a total 100 parts by weight of the component (A') and component (B') and (C) carbon black having a nitrogen specific surface area ($N_2SA$) of not more than 70 $m^2/g$ in an amount so that the total weight of the ingredient (B') and component (C) becomes 20 to 70 parts by weight with respect to 100 parts by weight of the total amount the component (A') and ingredient (B') and a pneumatic tire having a run flat property using this composition, in particular, for the side reinforcing rubber and/or bead filler.

BRIEF DESCRIPTION OF THE DRAWINGS

FIG. 1 is a cross-sectional view along the meridial direction showing a preferable aspect of the location of arrangement of a side reinforcing rubber layer in a pneumatic tire having a run flat property.

BEST MODE FOR CARRYING OUT THE INVENTION

The inventors engaged in research to solve the above-mentioned problems and, as a result, succeeded in obtaining a rubber composition capable of solving the problems by blending least one rubber (A) selected from NR, IR, SBR, BR, EPM, EPDM, a silicone rubber and/or fluororubber among the rubber crosslinkable with a peroxide with a polar polymer (B) having a solubility parameter (Sp value) of at least 17.6 ($Pa^{1/2}$) and a weight average molecular weight of at least 100,000, preferably 100,000 to 10,000,000, in an amount of at least 5 parts by weight but less than 40 parts by weight, preferably 10 to 30 parts by weight, based upon 100 parts by weight of the total amount with the above peroxide crosslinkable rubber (A). Note that the above Sp value is, for example, described in Japan Rubber Association ed., *Shin-ban Gomu Gijutsu no Kiso (New Edition—Basics of Rubber Technology)* (issued Apr. 30, 1999), page 101, while the weight average molecular weight is determined by gel permeation chromography.

As the polar polymer (B), it is preferable to use one comprised of 100 parts by weight of an ethylenically unsaturated nitrile-conjugated diene-based high saturation rubber having a conjugated diene unit content of 30 wt % or less, more preferably 5 to 20 wt % and 20 to 120 parts by weight, more preferably 30 to 100 parts by weight, of a metal salt of an ethylenic unsaturated carboxylic acid. Particularly, when a rubber composition comprising H-NBR (i.e., hydrogenated acrylonitrile-butadiene copolymer rubber), in which zinc methacrylate is blended, (for example, ZSC (brand-name) commercially available from Nippon Zeon) is used as the polar polymer, it is possible to effectively solve the defect of the low physical properties (e.g., low modulus and low resistance to flex fatigue) of a conventional peroxide crosslinked rubber.

In the present invention, when the content of the polymer (B) is less than 5 parts by weight, the anti-blooming property is poor, while when 40 parts by weight or more, the physical properties such as the bondability with other rubber and the strength at break are decreased and therefore these are not preferable. Further, when the weight average molecular weight of the polar polymer (B) is less than 100,000, the polar polymer per se cannot remain in the rubber and is liable to bleed out.

As specific examples of the polar polymer (B) blended into the rubber composition according to the present invention, the following may be mentioned (note the figures in parentheses indicate their typical Sp values): high styrene SBR (17.6 to 17.8), polystyrene (17.6 to 21.1), NBR (17.6 to 21.5), polysulfide rubber (18.4 to 19.2), chlorinated rubber (19.2), acryl rubber (17.8 to 18.5), urethane rubber (20.5), general chloroprene rubber (up to 19.2), polymethyl methacrylate (18.6 to 19.4), polyvinyl acetate (19.2 to 19.6), some chlorosulfonated polyethylenes (17.6 to 20.0), polyethylene terephthalate (21.9), epoxy resin (22.3), and phenol resin (23.1).

Further, it is also possible to use a modified polymer obtained by modifying a polymer having an Sp value of 17.6 or less so as to increase the polarity thereof. As examples, epoxylated natural rubber, epoxylated SBS, E-GMA-MA, or other epoxylated natural rubbers, maleated BR, maleated IR, maleated SBS, maleated PE and other maleic acid modified polymers, carboxylated NBR, carboxylated SBR, and other carboxyl modified polymers, etc. may be mentioned.

As the peroxide usable for crosslinking the rubber in the present invention, it is possible to use any organic peroxide usable for crosslinking a rubber composition. Specifically, for example, dicumyl peroxide, di-t-butyl peroxide, t-butyl-cumyl peroxide, benzoyl peroxide, 2,5-dimethyl-2,5-di(t-butylperoxy)hexine-3,2,5-dimethyl-2,5-di(benzoylperoxy) hexane, $\alpha,\alpha'$-bis(t-butylperoxy-m-isopropyl)benzene, etc. may be mentioned. These organic peroxides may be used alone or in any mixtures thereof and are preferably blended in an amount of 0.2 to 10 parts by weight, more preferably 0.2 to 6 parts by weight, based upon 100 parts by weight of rubber. The amount of the organic peroxide usable in the present invention is not particularly limited, but in general it is used in a range of 0.2 to 10 parts by weight. The rubber composition of the present invention is particularly effective in the case of a large amount blend of at least 1.5 parts by weight.

The rubber composition according to another aspect of the present invention is a rubber composition, cross-linked with an organic peroxide, containing an as component (A), (A') a rubber ingredient containing at least 40 parts by weight of a polybutadiene rubber (BR), as an component (B), (B') a rubber composition comprising 100 parts by weight of an ethylenically unsaturated nitrile-conjugated diene-based high saturation copolymer rubber having a conjugated diene unit content of not more than 30 wt %, into which a metal salt of an ethylenically unsaturated carboxylic acid is blended (hereinafter simply referred to as "the hydrogenated nitrile rubber" in some cases), in an amount of 5 to 40 parts by weight based upon 100 parts by weight of the total amount of the component (A') and component (B') and (C)-carbon black having a nitrogen specific surface area of not more than 70 m$^2$/g in an amount so that the total weight of the component (B') and component (C) becomes 20 to 70 parts by weight based upon 100 parts by weight of the total amount of the component (A') and component (B').

The inventors found that, when the rubber composition is used as the material for forming the side reinforcing rubber layer 9 having crescent sectional shape inserted and arranged between a carcass layer 4 and inner liner layer 5 of the side wall part 10 in the pneumatic tire shown in FIG. 1 for example, it is possible to make the side reinforcing rubber layer 9 higher in elasticity, without increasing the heat buildup and possible to improve the run flat performance, without increasing the rolling resistance, since the decrease in the modulus at a high temperature is small. Further, they discovered that the rubber composition of the present invention has a higher durability than a conventional rubber composition, even if the crosslinking density is increased and therefore the durability of the side reinforcing rubber layer 9 can be made equal to that of the past even if the cross-sectional area of the side reinforcing rubber layer 9 is decreased, and therefore, it is possible to obtain a light weight run flat tire, without adversely affecting the run flat property and the bondability with a conventional rubber is also superior. Note that in FIG. 1, 2 indicates a cap tread, 3 a belt, 6 a side tread, 7 a bead filler, 8 a bead and 11 a rim cushion.

In the second aspect of the present invention, as the hydrogenated nitrile rubber, an ethylenic unsaturated nitrile-conjugated diene-based high saturation copolymer rubber having a conjugated diene unit content, of 30 wt % or less, preferably 20 wt % or less, is used. When the content of the conjugated diene unit is more than 30 wt %, that is, when the partial hydrogenation rate is less than about 50%, it is not preferable that the strength of the rubber composition becomes insufficient and the desired strength cannot be obtained.

The hydrogenated nitrile rubber is a known polymer, namely a multi copolymer of a copolymer of an ethylenically unsaturated nitrile such as acrylonitrile or methacrylonitrile and a conjugated diene such as 1,3-butadiene, isoprene or 1,3-pentadiene and a monomer copolymerizable with the above two types of monomers such as a vinyl aromatic compound, (meth)acrylic acid, alkyl(meth)acrylate, alkoxyalkyl (meth)acrylate, cyanoalkyl(meth)acrylate, specifically an acrylonitrile-butadiene copolymer rubber, acrylonitrile-isoprene copolymer rubber, acrylonitrile-butadiene-isoprene copolymer rubber, acrylonitrile-butadiene-acrylate-methacrylic acid copolymer rubber, etc. may be mentioned. These rubbers preferably contain 30 to 60 wt % of the ethylenically unsaturated nitrile units and 30 wt % or less, preferably 20 wt % or less, of conjugated diene units, obtained by means such as partial hydrogenation of the conjugated diene units.

The crescent sectional shape side reinforcing rubber layer of the pneumatic tire according to the present invention must be formed from a rubber composition containing a hydrogenated nitrile rubber-containing composition (B'), comprising 100 parts by weight of the hydrogenated nitrile rubber, in which 20 to 120 parts by weight, preferably 30 to 100 parts by weight, of a metal salt of an ethylenic unsaturated carboxylic acid such as zinc methacrylate is blended, in an amount of 5 to 40 parts by weight based upon 100 parts by weight of the components (A') and (B') and carbon black (C) having a nitrogen specific surface area of 70 m$^2$/g or less in an amount giving a total of the amounts of the component (B') and component (C) of 20 to 70 parts by weight, preferably 30 to 60 parts by weight, based upon 100 parts by weight of the total amount of the components (A') and (B'). In the hydrogenated nitrile rubber containing composition (B'), when the hydrogenated nitrile rubber exceeds 40 parts by weight, the bondability with tire rubber will become poor, and therefore it will be necessary to unpreferably provide an adhesive rubber layer separately like in conventional tire configurations. Further, when the amount of the metal salt of the ethylenically unsaturated carboxylic acid blended into the hydrogenated nitrile rubber containing composition (B') is less than 20 parts by weight, the high hardness sought from the side reinforcing rubber layer cannot be obtained. On the other hand, when the amount is more than 120 parts by weight, it is not preferable that the bondability with tire rubber will become poor and the heat buildup of the rubber will become too great.

According to the present invention, carbon black having a nitrogen specific surface area (determined according to Paragraph 7, Method A of JIS K6217) of not more than 70 m$^2$/g, preferably 20 to 60 m$^2$/g, is blended in an amount such that a total weight with the ingredient (B') becomes 20 to 70 parts by weight based upon 100 parts by weight of the total amount the components (A') and (B'). When the nitrogen specific surface area of the carbon black (C) is too large, it is not preferable that the heat buildup of the rubber becomes higher. Further, when the amount blended is too small, it is not preferable that the high hardness required from the side reinforcing rubber layer cannot be obtained, when the amount is too large, it is not preferable that the heat buildup of the rubber becomes greater.

The method for mixing the metal salt of an ethylenically unsaturated carboxylic acid into the hydrogenated nitrile rubber composition (B') is not particularly limited, but, for example, it is possible to use a roll, Banbury mixer, kneader, single-screw extruder, twin-screw extruder, or other mixer normally used in the rubber industry. Further, in addition to the method for mixing a metal salt of an ethylenically unsaturated carboxylic acid with a hydrogenated nitrile rubber, the method may also be adopted of mixing zinc oxide, zinc carbonate or another metal compound into the hydrogenated nitrile rubber first, sufficiently disperse them, then get the ethylenically unsaturated carboxylic acid mixed or absorbed to produce a metal salt of an ethylenically unsaturated carboxylic acid in a polymer. This method is preferable in that it gives an extremely good dispersibility of the metal salt of the ethylenic unsaturated carboxylic acid. Further, it is also preferable to use a composition in which the zinc methacrylate and a zinc compound are dispersed in a hydrogenated nitrile rubber in advance. This is commercially available from Nippon Zeon as the "ZSC" (brandname) series, for example, ZSC2295, ZSC2295N, ZSC2395, and ZSC2298 and can be easily obtained.

Note that the hydrogenated nitrile rubber composition (B') must be crosslinked using the above-mentioned organic peroxide. The amount used is preferably 0.2 to 10 parts by weight, more preferably 0.2 to 6 parts by weight, based upon 100 parts by weight of the total amount of the components (A') and (B').

The rubber compositions according to the present invention may also include, in addition the above essential components, a filler such as carbon black or silica, a co-crosslinking agent, various types of softeners, an antioxidant, a plasticizer, and other various types of additives generally blended into tire use and other general use rubber. The amounts of these additives blended may be made the conventional general amounts so long as the objects of the present invention are not adversely affected.

According to the present invention, since a high hardness, high physical property rubber composition improved in anti-blooming is obtained, it is useful as a rubber product such as a tire, in particular a rim cushion, undertread, hose, belt, shoe sole, engine mount, weather strip, constant velocity joint boot, bush, etc. The method for the production of the rubber product may also be made one of the past. Further, according to the second aspect of the present invention, this is useful as side reinforcing rubber and/or bead filler of a pneumatic tire having a run flat property.

EXAMPLES

The present invention will now be explained further by but is by no means limited to, the following Examples.

Examples I-1 to I-4 and Comparative Examples I-1 to I-4

In the formulation shown in Table I-1, the ingredients, other than the vulcanization accelerator, sulfur, organic peroxide and co-crosslinking agent, were mixed in a 1.5-liter internal mixer for 3-5 minutes and the resultant mixture was discharged, when reaching 165±5° C., to obtain a master batch. The vulcanization accelerator, sulfur, organic peroxide and co-crosslinking agent were mixed with the master batch by an 8-inch open roll to obtain a rubber composition.

The rubber composition (unvulcanized) obtained was subjected to a bloom test (i.e., visual judgment). Then, the composition was press vulcanized in a 15×15×0.2 cm mould at 160° C. for 20 minutes to prepare a desired test piece (i.e., rubber sheet) which was then evaluated for vulcanized physical properties (i.e., 100% modulus and elongation at break determined before aging and after aging according to a JIS K6251 method). The results are shown in Table I-1.

TABLE I-1

| Name of Starting Material | Comp. Ex. I-1 | Comp. Ex. I-2 | Comp. Ex. I-3 | Comp. Ex. I-4 | Ex. I-1 | Ex. I-2 | Ex. I-3 | Ex. I-4 |
|---|---|---|---|---|---|---|---|---|
| Formulation (parts by weight) | | | | | | | | |
| Natural rubber | 60 | 60 | 60 | 60 | 55 | 55 | 50 | 55 |
| SBR | 40 | 40 | 40 | — | — | — | — | 40 |
| BR | — | — | — | 40 | 40 | 40 | 30 | — |

TABLE I-1-continued

| Name of Starting Material | Comp. Ex. I-1 | Comp. Ex. I-2 | Comp. Ex. I-3 | Comp. Ex. I-4 | Ex. I-1 | Ex. I-2 | Ex. I-3 | Ex. I-4 |
|---|---|---|---|---|---|---|---|---|
| NBR | — | — | — | — | 5 | — | — | — |
| HNBR/ZnMA composite | — | — | — | — | — | 5 | 20 | — |
| Epoxylated SBS | — | — | — | — | — | — | — | 5 |
| Carbon black | 50 | 50 | 50 | 50 | 50 | 50 | 40 | 50 |
| Zinc white | 5 | 5 | 5 | 5 | 5 | 5 | 5 | 5 |
| Stearic acid | 1 | 1 | 1 | 1 | 1 | 1 | 1 | 1 |
| Antioxidant | 1 | 1 | 1 | 1 | 1 | 1 | 1 | 1 |
| Oil-treated sulfur | 4 | — | — | — | — | — | — | — |
| Insoluble sulfur | — | 4 | — | — | — | — | — | — |
| Vulcanization accelerator | 2 | 2 | — | — | — | — | — | — |
| Organic peroxide | — | — | 3 | 3 | 3 | 3 | 3 | 3 |
| Co-crosslinking agent | — | — | 1 | 1 | 1 | 1 | 1 | 1 |
| Bloom test *1 (Visual judgment) | | | | | | | | |
| After mixing 24 hours | VG | VG | VG | G | VG | VG | VG | VG |
| After mixing 3 days | G | G | F | F | VG | VG | VG | VG |
| After mixing 2 weeks | F | G | P | P | G | G | VG | G |
| After mixing 1 month | P | F | P | P | F | F | G | F |
| Physical property tests | | | | | | | | |
| Initial (before aging) | | | | | | | | |
| 100% modulus (MPa) | 4.0 | 4.2 | 3.3 | 2.9 | 3.5 | 4.9 | 7.5 | 3.2 |
| Elongation at break (%) | 410 | 430 | 390 | 350 | 360 | 410 | 450 | 380 |
| After aging (80° C., 1 week) | | | | | | | | |
| 100% modulus (MPa) | 5.3 | 5.6 | 3.4 | 3.1 | 3.7 | 4.9 | 7.6 | 3.3 |
| Elongation at break (%) | 350 | 350 | 380 | 340 | 350 | 400 | 450 | 370 |
| Rate of change in modulus (aged/initial) | 1.33 | 1.33 | 1.03 | 1.07 | 1.06 | 1.00 | 1.01 | 1.03 |

*1 Judgment criteria of bloom test
VG (very good): No crystals of compounding agents observed on surface of unvulcanized rubber at all.
G (good): Extent of slight crystallization seen through magnifying glass
F (fair): Crystals of compounding agents clearly discernable by naked eye
P (poor): Surface of unvulcanized rubber covered white by crystals of compounding agents
Note of Table I-1
Natural rubber: RSS#3
SBR: Nipol 1502 (Nippon Zeon)
BR: Nipol BR 1220 (Nippon Zeon)
NBR: Nipol DN 401 (Nippon Zeon)
HNBR/ZnMA: ZSC 2395 (Nippon Zeon)
Epoxylated SBS: Epofriend A1020 (Daicel Chemical Industries)
Carbon black: Seast 300 (Tokai Carbon) ($N_2SA = 82$ m$^2$/g)
Zinc white: Zinc White #3 (Seido Chemical Industry)
Stearic acid: Beads Stearic Acid (Kao)
Antioxidant: Nocrack 6C (Ouchi Shinko Chemical Industrial)
Oil treated sulfur: Oil-treated sulfur (Karuizawa Refinery)
Insoluble sulfur: Crystex HSOT20 (Akzo Nobel)
Vulcanization accelerator: Nocceler NS-P (Ouchi Shinko Chemical Industrial)
Organic peroxide: Parkadox 14/40 (Kayaku Akzo)
Co-crosslinking agent: Acrylester TMP (Mitsubishi Rayon)

As shown in Table I-1, Comparative Example I-1 is an example of use of ordinary sulfur. One month after mixing, it became entirely white bloomed. The thermal aging resistance was also poor. Comparative Example I-2 is an example of use of insoluble sulfur. The anti-blooming property is improved, but the thermal aging resistance is poor. Comparative Example I-3 is an example of use of an organic peroxide. The anti-blooming property becomes poorer than that in the case of sulfur vulcanization and the initial physical properties are low. Comparative Example I-4 is an example of use of an organic peroxide. The anti-blooming property becomes poorer than in the case of sulfur vulcanization and the initial properties are low.

Example I-1 is an example of use of NBR as a polar polymer. The anti-blooming property is remarkably improved. Example I-2 is an example of use of an HNBR/ZnMA composite as a polar polymer. The anti-blooming property is remarkably improved and the modulus is improved. Example I-3 is an example of increase of the weight of ZSC. The anti-blooming property is further improved and the physical properties are remarkably improved. Example I-4 is an example of use of ESBS as the polar polymer. This is also improved in the anti-blooming property.

Preparation of Samples of Standard Example II-1, Examples II-1 to II-5 and Comparative Examples II-1 to II-4

According to the formulation shown in Table II-1, the ingredients except for the organic peroxide and co-crosslinking agent were mixed in a 16-liter internal Banbury mixer for 3 to 5 minutes and discharged, when reaching 165±5° C. The organic peroxide and co-crosslinking agent were mixed into this by an open roll. The rubber composition obtained was then cross-linked in a 15×15×0.2 cm mould at 160° C. for 20 minutes to prepare a rubber sheet. This was then measured for physical properties of the crosslinked rubber by the following test methods. The results are shown in Table II-1.

Test Methods for Evaluation of Rubber Physical Properties

50% modulus (MPa): Determined based on a JIS (Japanese Industrial Standards) K6251 method tanδ (100° C.): Determined using Toyo Seiki viscoelasticity spectrometer at an elongation deformation strain rate of 10±2% and a vibration number of 20 Hz.

Run Flat Durability Test

A 205/55R16 test tire was attached to the front right wheel of a 2500 cc displacement FR passenger car. It was first run on at an air pressure of 200 kPa at 90 km/h around a circuit course two times counterclockwise, then the core of the valve was pulled out and tire run on in a state of zero air pressure at a speed of 90 km/h counterclockwise. The running distance until the test driver felt abnormal vibration due to the tire failure and stopped driving was expressed indexed to a standard example of tire as 100. The larger the figure, the better the run flat durability shown.

TABLE II-2-continued

| Ingredients of Formulation | Amount blended (parts by weight) |
| --- | --- |
| Carbon) ($N_2SA = 82$ $m^2/g$) | |
| Zinc white (Zinc White #3, made by Seido Chemical Industrial) | 5 |
| Stearic acid (Beads Stearic Acid, made by Kao) | 1.5 |
| Antioxidant (Nocrack 6C, made by Ouchi Shinko Chemical Industrial) | 2 |
| Aromatic petroleum resin (FR-120, made by Fuji Kosan) | 10 |
| Organic peroxide (Parkadox 14/40, made by Kayaku Akzo) | 3 |
| Co-crosslinking agent (DAP monomer, made by Daiso) | 15 |

Standard Example II-1 is an example according to a method described in Japanese Unexamined Patent Publication (Kokai) No. 2002-30187. This is an example of an adhesive rubber layer. This tire forms the standard for the

TABLE II-1

| | Stand. Ex. II-1 | Comp. Ex. II-1 | Comp. Ex. II-2 | Comp. Ex. II-3 | Comp. Ex. II-4 | Ex. II-1 | Ex. II-2 | Ex. II-3 | Ex. II-4 | Ex. II-5 |
| --- | --- | --- | --- | --- | --- | --- | --- | --- | --- | --- |
| Ingredients of formulation (parts by weight) | | | | | | | | | | |
| Natural rubber (RSS#3) | 40 | 40 | 60 | 50 | 20 | 30 | 20 | 20 | 20 | 20 |
| BR (Nipol BR1220, Nippon Zeon) | — | — | 30 | 40 | 45 | 40 | 60 | 75 | 45 | 45 |
| HNBR/ZnMA composite (ZSC 2395, Nippon Zeon) | 60 | 60 | 10 | 10 | 35 | 30 | 20 | 5 | 35 | 35 |
| Carbon FEF grade (HTC#100, NSC Carbon) *1 | 10 | 10 | 20 | 0 | — | 10 | 30 | 60 | 35 | — |
| Carbon GPF grade (HTC#G, NSC Carbon) *1 | — | — | — | — | — | — | — | — | — | 35 |
| Carbon HAF grade (Shoblack N339, made by Showa Cabot) *1 | — | — | — | — | 35 | — | — | — | — | — |
| Zinc white (Zinc White #3, Seido Chemical Industrial) | 3 | 3 | 3 | 3 | 3 | 3 | 3 | 3 | 3 | 3 |
| Stearic acid (Beads Stearic Acid, Kao) | 1 | 1 | 1 | 1 | 1 | 1 | 1 | 1 | 1 | 1 |
| Organic peroxide (Parkadox 14/40, Kayaku Akzo) | 4 | 4 | 4 | 4 | 4 | 4 | 4 | 4 | 4 | 4 |
| Co-crosslinking agent (Acrylester TMP, Mitsubishi Rayon) | 1 | 1 | 1 | 1 | 1 | 1 | 1 | 1 | 1 | 1 |
| Physical properties test | | | | | | | | | | |
| 50% modulus (MPa) | 4.9 | 4.9 | 2.8 | 2.4 | 7.7 | 3.8 | 5.6 | 4.5 | 6.8 | 6.4 |
| tanδ (100° C.) | 0.15 | 0.15 | 0.18 | 0.06 | 0.20 | 0.09 | 0.07 | 0.11 | 0.14 | 0.10 |
| Run flat durability test | | | | | | | | | | |
| Adhesive rubber layer *2 | Yes | None | None | None | None | None | None | None | None | None |
| Run flat distance (index) | 100 | 18 | 62 | 80 | 68 | 125 | 180 | 136 | 100 | 130 |

*1 Specific area of carbon black used ($m^2/g$)
HTC#100: 35
HTC#G: 25
Shoblack N339: 90
*2 See Table II-2.

TABLE II-2

| Ingredients of Formulation | Amount blended (parts by weight) |
| --- | --- |
| Natural rubber (RSS#3) | 60 |
| HNBR/ZnMA composite (ZSC 2395, made by Nippon Zeon) | 40 |
| Carbon black FEF grade (Seast 300, made by Tokai | 30 | durability test. Comparative Example II-1 is an example of omission of the adhesive rubber layer and suffers from early failure due to delaminating of the reinforcing rubber. Comparative Example II-2 is an example of reduction of the HNBR/ZnMA composite and inclusion of BR. If the amount of BR is small, heat buildup results in early failure. Comparative Example II-3 shows that even if increasing the BR, if the amounts of the HNBR/ZnMA composite and carbon black are small, the hardness is insufficient and results in early failure. Comparative Example 4 shows that, if using carbon black having a nitrogen specific area of 70 or more, the heat buildup becomes large and the durability is decreased.

Example II-1 is an example of suitable blending of the amounts of BR, HNBR/ZnMA composite and carbon black. There is no peeling and the durability is improved. Example II-2 shows that, if further increasing the BR, the durability is further improved. Example II-3 shows that if the total amount of the carbon black and HNBR/ZnMA composite is 70 parts by weight or less, a good durability is exhibited. Example II-4 shows that, if using carbon black having a further smaller nitrogen specific area, the tanδ is decreased and the durability is further improved.

INDUSTRIAL APPLICABILITY

As explained above, by blending a certain amount of a polar polymer having an Sp value of at least 17.6 $Pa^{1/2}$ and a weight average molecular weight of at least 100,000 into a peroxide cross-linkable rubber, a peroxide cross-linkable rubber composition remarkably improved in anti-blooming property is obtained. In particular, by making the polar rubber an HNBR/ZnMA composite of HNBR into which zinc methacrylate is blended, the defect of the prior art of the inferior modulus and other physical properties compared with the sulfur cross-linking is eliminated and a rubber composition superior in heat resistance can be obtained. In particular, according to the present invention, it is possible to obtain a good vulcanized bondability with a conventional rubber, while maintaining the high hardness required for a side reinforcing rubber of a run flat tire and possible to produce a run flat tire, without using an adhesive rubber layer. In the present invention, if decreasing the amount of the HNBR/ZnMA composite in the rubber composition, it is no longer possible to maintain the high hardness, but by blending in a certain amount or more of BR with a high crosslinking efficiency of an organic peroxide and mixed with carbon black having a specified nitrogen specific surface area, it is possible to obtain a rubber composition having a remarkably low heat buildup while maintaining a high hardness, after vulcanization.

The invention claimed is:

1. A peroxide-crosslinkable rubber composition having a run flat property comprising:
   (A) more than 60 parts by weight but not more than 95 parts by weight of a rubber component comprising (i) a natural rubber (NR) and (ii) a polybutadiene rubber (BR), and (iii) optionally, at least one rubber selected from the group consisting of a styrene-butadiene copolymer rubber (SBR), an ethylene-propylene rubber (EPM), an ethylene-propylene-diene terpolymer (EPDM), a silicone rubber and a fluororubber,
   (B) at least 5 parts by weight but less than 40 parts by weight of a polar polymer, which comprises 100 parts by weight of an ethylenically unsaturated nitrile-conjugated diene-based high saturation copolymer rubber having a conjugated diene unit content of 30 wt % or less and 20 to 120 parts by weight of a metal salt of an ethylenically unsaturated carboxylic acid blended therein, and
   (C) carbon black having a nitrogen specific surface area ($N_2SA$) of not more than 70 $m^2/g$ in an amount so that the total weight of the components (B) and (C) becomes 20 to 70 parts by weight, based upon 100 parts by weight of the total amount of the components (A) and (B).

2. A rubber composition as claimed in claim 1, wherein a 50% modulus of said rubber composition is 3.0 to 10 MPa and a tanδ at 100° C. of said rubber composition is not more than 0.15.

3. A run-flat pneumatic tire using a rubber composition according to claim 1.

4. A run-flat pneumatic tire using a rubber composition according to claim 1 as a side reinforcing wall and/or bead filler, without using an adhesive rubber.

5. A rubber composition as claimed in claim 1, wherein an organic peroxide is used as a cross-linking agent.

* * * * *